(12) United States Patent
Takahashi et al.

(10) Patent No.: US 7,733,511 B2
(45) Date of Patent: Jun. 8, 2010

(54) IMAGE PROCESSING SYSTEM

(75) Inventors: Kenichi Takahashi, Sennan-gun (JP);
Kaitaku Ozawa, Amagasaki (JP);
Munehiro Nakatani, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1329 days.

(21) Appl. No.: 10/808,375

(22) Filed: Mar. 25, 2004

(65) Prior Publication Data
US 2004/0207872 A1 Oct. 21, 2004

(30) Foreign Application Priority Data
Mar. 26, 2003 (JP) .............................. P2003-085225

(51) Int. Cl.
*G06F 3/12* (2006.01)
(52) U.S. Cl. ................. 358/1.15; 358/1.16; 358/426.06; 358/1.9; 358/504; 382/235; 382/164; 382/233; 709/203; 709/231; 348/14.08
(58) Field of Classification Search ................ 358/1.15, 358/1.9, 504, 505, 426.06; 382/164, 235; 375/E7.074, E7.075, E7.187, 240.01; 709/203, 709/231, 246, 247; 348/14.08, 14.09
See application file for complete search history.

(56) References Cited

U.S. PATENT DOCUMENTS

| 6,944,358 B2 * | 9/2005 | Morimoto et al. ............ 382/304 |
| 7,013,049 B2 * | 3/2006 | Sakuyama ................... 382/240 |
| 7,154,622 B2 * | 12/2006 | Constantin et al. .......... 358/1.15 |
| 7,224,491 B2 * | 5/2007 | Shinchi et al. ............... 358/400 |
| 7,315,652 B2 * | 1/2008 | Takahashi et al. ............ 382/233 |
| 2002/0036792 A1 * | 3/2002 | Murphy ...................... 358/1.15 |
| 2002/0118894 A1 * | 8/2002 | Morimoto et al. ............ 382/305 |
| 2003/0002068 A1 * | 1/2003 | Constantin et al. .......... 358/1.15 |
| 2003/0067627 A1 * | 4/2003 | Ishikawa et al. ............ 358/1.15 |
| 2003/0068089 A1 * | 4/2003 | Sano et al. ................... 382/232 |
| 2003/0233437 A1 * | 12/2003 | Kitada et al. ................ 709/223 |
| 2004/0001220 A1 * | 1/2004 | Gorday et al. .............. 358/1.15 |
| 2004/0032624 A1 * | 2/2004 | Stevens et al. .............. 358/402 |
| 2004/0190784 A1 * | 9/2004 | Ozawa et al. ................ 382/232 |
| 2004/0207872 A1 * | 10/2004 | Takahashi et al. ........... 358/1.15 |
| 2005/0074174 A1 * | 4/2005 | Ishikawa ..................... 382/232 |

FOREIGN PATENT DOCUMENTS

JP 06-253158 9/1994

(Continued)

OTHER PUBLICATIONS

Japan Patent Office. Japan Application No. 2003-085225. Office Action dated Aug. 2, 2005.

(Continued)

*Primary Examiner*—Negussie Worku
(74) *Attorney, Agent, or Firm*—Buchanan Ingersoll & Rooney PC

(57) ABSTRACT

The invention provides an image processing system which can give different securities to data of respective receivers with a simple operation and, in this case, which can realize shortening of time for communication to a destination and suppression of use of memory resources. A plurality of regions preset in image data are related to destinations, code data constituting one of regions corresponding to the destinations or the other regions is replaced with code data which make pieces of information included in the regions invisible in the JPEG2000 file transmitted to the destinations, and the JPEG2000 file after the replacing process is transmitted to the destinations.

13 Claims, 16 Drawing Sheets

FOREIGN PATENT DOCUMENTS

| | | |
|---|---|---|
| JP | 2001051905 A | 2/2001 |
| JP | 2001230947 A | 8/2001 |
| JP | 2002-044356 | 2/2002 |
| JP | 2002218147 A | 8/2002 |

OTHER PUBLICATIONS

Japan 2002-044356 English Translation.
Japan 06-253158 English Translation.

* cited by examiner

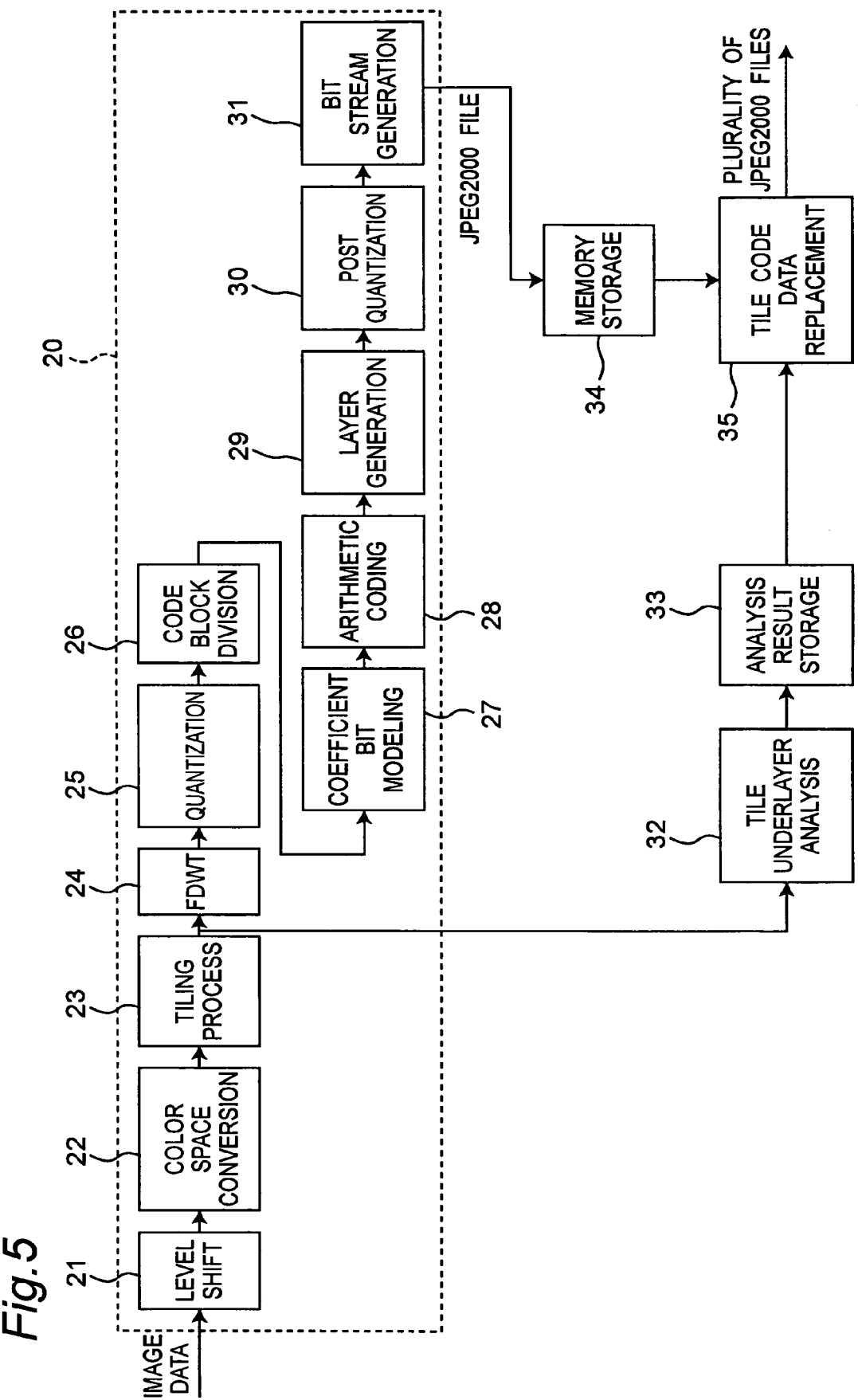

Fig.6

| | | R | G | B | Y | Cb | Cr |
|---|---|---|---|---|---|---|---|
| MARKER COLOR | RED | 255 | 173 | 230 | 186.166 | 14.66077 | 54.98532 |
| | BLUE | 83 | 246 | 255 | 192.479 | 32.00379 | -61.5791 |
| | YELLOW | 234 | 254 | 158 | 220.696 | -44.6275 | 10.57143 |
| | GREEN | 169 | 255 | 143 | 204.688 | -41.4901 | -22.3473 |

Fig.7

| TILE | ANALYSIS RESULT |
|---|---|
| T0 | |
| T1 | |
| T2 | |
| T3 | RED |
| ⋮ | |
| T100 | |
| T101 | YELLOW |
| T102 | YELLOW |
| T103 | YELLOW |
| ⋮ | |
| T200 | BLUE |
| T201 | BLUE |
| T202 | BLUE |
| T203 | |
| ⋮ | |

| MARKER COLOR | DESTINATION | REPLACEMENT COLOR |
|---|---|---|
| RED | A | RED(0) |
| YELLOW | B | BLACK(1) |
| BLUE | C | BLUE(2) |
| ⋮ | ⋮ | ⋮ |

*Fig.12A*

| | |
|---|---|
| AAA | xxxxxxxxxxxxxxx |
| BBB | xxxxxxxxxxxxxxx |
| CCC | xxxxxxxxxxxxxxx |
| ABC | xxxxxxxxxxxxxxx |
| BCA | xxxxxxxxxxxxxxx |
| CAB | xxxxxxxxxxxxxxx |
| XYZ | xxxxxxxxxxxxxxx |
| YZX | xxxxxxxxxxxxxxx |
| ZXY | xxxxxxxxxxxxxxx |
| LMN | xxxxxxxxxxxxxxx |
| MLN | xxxxxxxxxxxxxxx |
| NLM | xxxxxxxxxxxxxxx |

| | |
|---|---|
| AAA | xxxxxxxxxxxxxxx |
| BBB | xxxxxxxxxxxxxxx |
| CCC | xxxxxxxxxxxxxxx |
| ABC | xxxxxxxxxxxxxxx |
| BCA | xxxxxxxxxxxxxxx |
| CAB | xxxxxxxxxxxxxxx |
| XYZ | xxxxxxxxxxxxxxx |
| YZX | xxxxxxxxxxxxxxx |
| ZXY | xxxxxxxxxxxxxxx |
| LMN | xxxxxxxxxxxxxxx |
| MLN | xxxxxxxxxxxxxxx |
| NLM | xxxxxxxxxxxxxxx |

| | | |
|---|---|---|
| 81 | AAA | xxxxxxxxxxxxxxxx |
| | BBB | xxxxxxxxxxxxxxxx |
| | CCC | xxxxxxxxxxxxxxxx |
| 72 | ABC | xxxxxxxxxxxxxxxx |
| | BCA | xxxxxxxxxxxxxxxx |
| | CAB | xxxxxxxxxxxxxxxx |
| | XYZ | xxxxxxxxxxxxxxxx |
| | YZX | xxxxxxxxxxxxxxxx |
| | ZXY | xxxxxxxxxxxxxxxx |
| 83 | LMN | xxxxxxxxxxxxxxxx |
| | MLN | xxxxxxxxxxxxxxxx |
| | NLM | xxxxxxxxxxxxxxxx |

| | | |
|---|---|---|
| 71 | AAA | xxxxxxxxxxxxxxxx |
| | BBB | xxxxxxxxxxxxxxxx |
| | CCC | xxxxxxxxxxxxxxxx |
| 82 | ABC | xxxxxxxxxxxxxxxx |
| | BCA | xxxxxxxxxxxxxxxx |
| | CAB | xxxxxxxxxxxxxxxx |
| | XYZ | xxxxxxxxxxxxxxxx |
| | YZX | xxxxxxxxxxxxxxxx |
| | ZXY | xxxxxxxxxxxxxxxx |
| 83 | LMN | xxxxxxxxxxxxxxxx |
| | MLN | xxxxxxxxxxxxxxxx |
| | NLM | xxxxxxxxxxxxxxxx |

(80B)

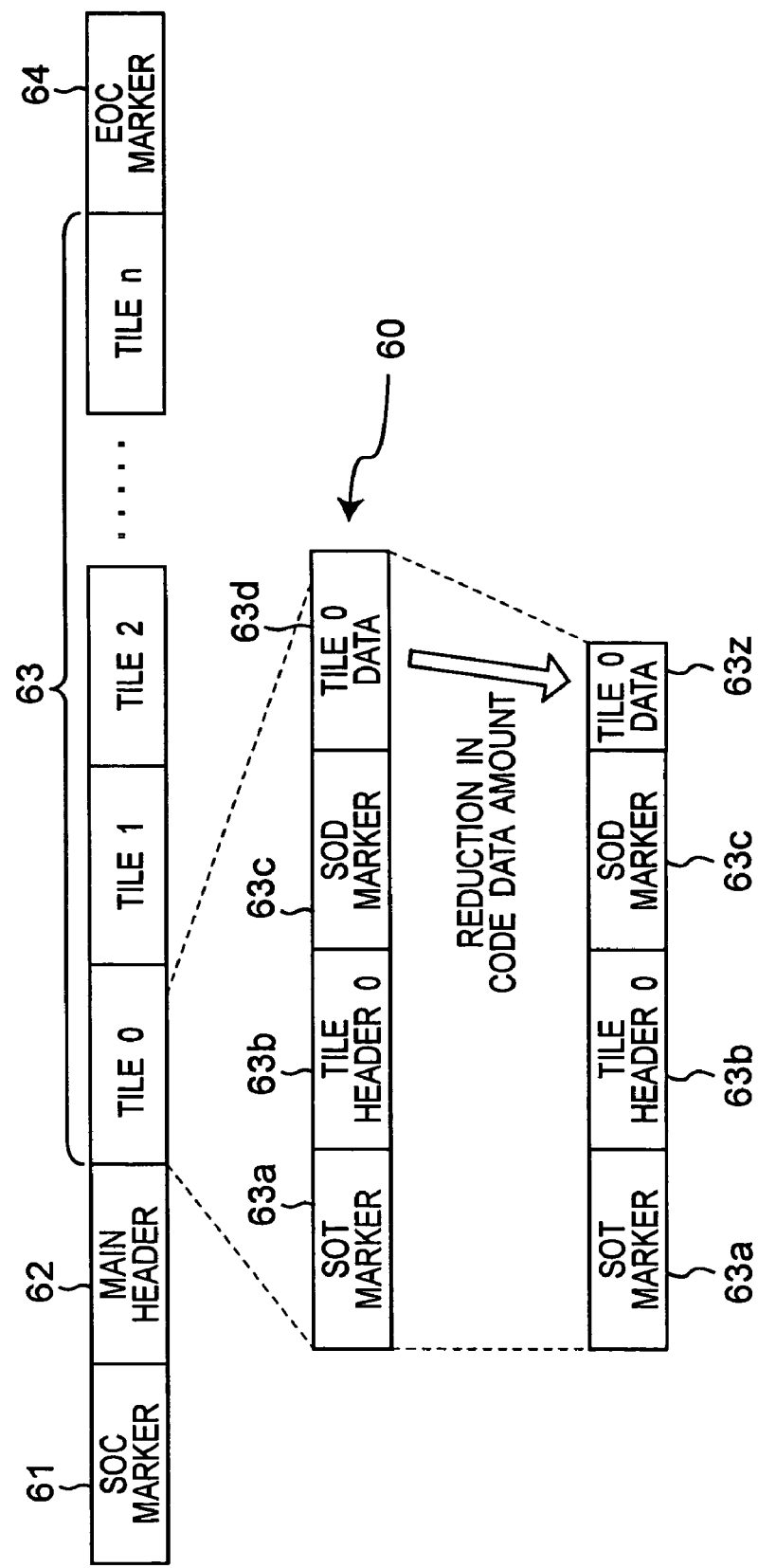

| MARKER COLOR | DESTINATION |
|---|---|
| RED | A |
| YELLOW | B |
| BLUE | C |
| ⋮ | ⋮ |

Fig.19

| MARKER COLOR | DESTINATION | CUTOFF LEVEL |
|---|---|---|
| RED | A | 0 |
| YELLOW | A | 1 |
| YELLOW | B | 0 |
| BLUE | B | 2 |
| ⋮ | ⋮ | ⋮ |

IMAGE PROCESSING SYSTEM

This application is based on application No. 2003-85225 filed in Japan, the contents of which is hereby incorporated by reference.

BACKGROUND OF THE INVENTION

1. Field of the Invention

The present invention relates to an image processing system which can process a JPEG2000 file.

2. Description of the Related Art

In a conventional case in which information data is transmitted between devices on a network, various techniques have been devised in order to secure the security of transmitted information. For example, Japanese Patent laid-open Publication No. 2001-51905 discloses a technique in which setting for permission or inhibition of reference of a document is performed for each receiver on a transmitter. For example, Japanese Patent laid-open Publication No. 2002-218147 discloses a technique in which a document file is transmitted in a file format predetermined for each receiver.

However, in such techniques, permission or inhibition is set in units of documents, a specific region and other regions in a document cannot be distinctively processed. Even though all pieces of information in the document are not classified matter, that is, even though the document partly include non-confidential information, a receiver who has been inhibited from receiving the pieces of information cannot see information at all.

As a conventional technique for ensuring a document security with discriminating a specific region and the other regions in the document, for example, a technique in which an ROI region set on an image can be compressed by means of a compression ratio different from that of another region in JPEG2000 format is disclosed in Japanese Patent lain-open Publication No. 2001-230947.

However, with the technique disclosed in Japanese Patent lain-open Publication No. 2001-230947, a region in which a document is permitted to be read or inhibited from being read must be set for each original every receiver. This setting operation is troublesome.

SUMMARY OF THE INVENTION

The present invention has been made in consideration of the above technical problems, and has its object to provide an image processing system which can give different securities to data of respective receivers without troublesome operation and, in this case, which can realize shortening of time for communication to a destination and suppression of use of memory resources.

In an aspect of the present invention, there is provided an image processing system which can code image data, form a JPEG2000 file, and transmit the JPEG2000 file to a plurality of destinations. The image processing system includes: a relator which relates a plurality of regions preset in the image data to each of the destinations, respectively; a replacer which replaces coded data ("code data" hereafter) constituting either one of regions corresponding to the destinations or the other regions with code data which make pieces of information included in the regions invisible in the JPEG2000 file to be transmitted to each of the destinations; and a transmitter which transmits the JPEG2000 file processed by the replacer to the destinations.

In another aspect of the present invention, there is provided an image processing system which can code image data, form a JPEG2000 file, and transmit the JPEG2000 file to a plurality of destinations. The image processing system includes: a relator which relates a plurality of regions preset in the image data to each of the destinations; a reducer which reduces a data amount of code data constituting either one of the regions corresponding to the destinations or the other regions in the JPEG2000 file to be transmitted to the destinations; and a transmitter which transmits the JPEG2000 files processed by the data amount reducer. In this aspect, the data amount of the code data reduced from the regions by the data amount reducer may be set for the respective destinations and the regions.

Furthermore, according to the above aspect, different color components are added to the regions preset in the image data, respectively, and the image processing system may have a color component detector which detects the color components to recognize the regions.

Still furthermore, according to the above aspect, only code data being different for a plurality of destinations in JPEG2000 file may be separately transmitted to each of the destinations, while the code data being common for the destinations being simultaneously transmitted to the destinations.

BRIEF DESCRIPTION OF THE DRAWINGS

FIG. 5 is a diagram showing a flow of a process of coding image data into a JPEG2000 file to make it impossible to read a region added with a predetermined marker color and a process of forming different files for each of destinations, respectively.

FIG. 6 is a table showing an example of the relationship between RGB values of marker colors and YCbCr values obtained after color space conversion.

FIG. 7 is a table showing an example of an analysis result of marker colors on respective tiles.

FIG. 12A is a diagram showing an original document according to the second embodiment of the present invention.

FIG. 12B is a diagram showing a document in which line markers of different colors are added to regions, respectively.

FIG. 13A is a diagram showing a document image transmitted to destination A.

FIG. 13B is a diagram showing a document image transmitted to destination B.

FIG. 14 is a diagram illustrating a process of reducing a code data amount in a bitstream configuration of a JPEG2000 file.

FIG. 19 is a table showing the relationship between "marker color", "destination", "replacement color", and "cutoff level" which are set prior to transmission of a document file in an MFP.

DESCRIPTION OF THE PREFERRED EMBODIMENTS

Embodiments of the present invention will be described below with reference to the accompanying drawings.

First Embodiment

Figure 1:
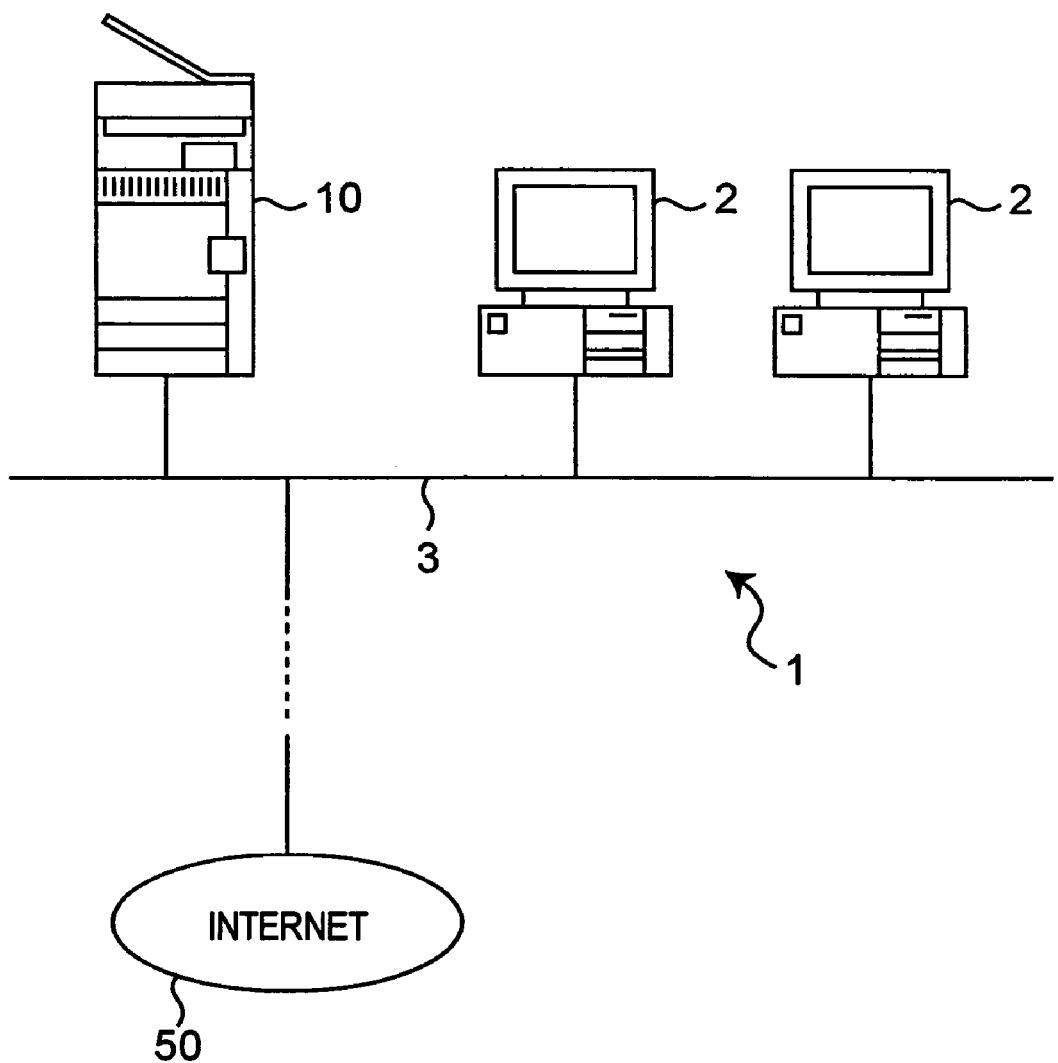
FIG. 1 is a diagram showing a network system including an MFP according to the first embodiment of the present invention.

FIG. 1 is a schematic diagram showing a network system including a multiple function peripheral according to the first embodiment of the present invention. This network system 1 includes a Multiple Function Peripheral ("MFP") 10 having multiple functions of a printer, a facsimile, a copier, a scanner, and the like and a plurality of terminal devices 2 such as personal computers or the like. These devices are connected to each other through a network bus 3 to make it possible to transmit and receive data. In the network system 1, for example, a manuscript may be read by a scanner 11 (see FIG. 2) of the MFP 10 to acquire information data (including image data), and then the information data may be transmitted to the terminal devices 2 to make it possible to display the information data on the terminal devices 2, or may be transmitted from the terminal devices 2 to the MFP 10 to make it possible to print the information data.

The network system 1 may be connected to the internet 50 through the network bus 3. In this case, the MFP 10 can receive information data from a remote terminal device on another network through the internet 50 and can print the information data if necessary.

Figure 2:
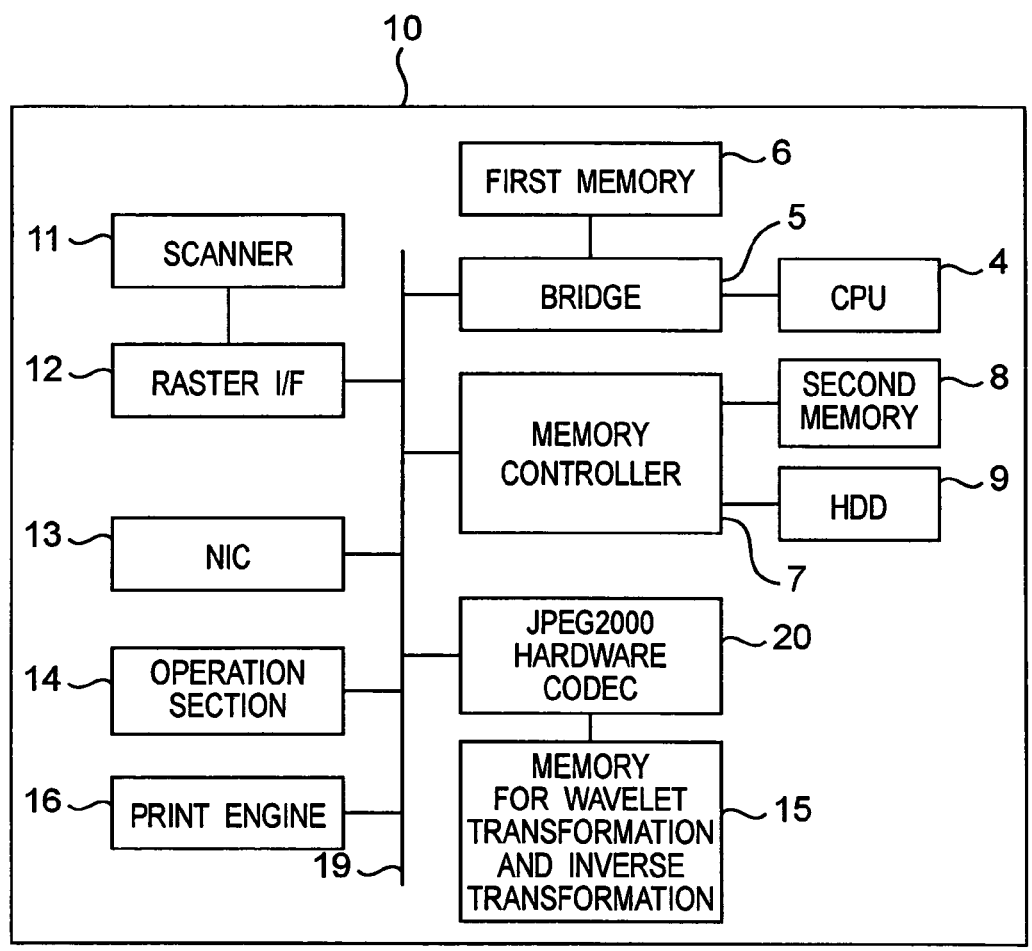
FIG. 2 is a block diagram showing the basic configuration of the MFP.

FIG. 2 is a schematic block diagram showing the entire configuration of the MFP 10. The MFP 10 has a CPU 4 which makes it possible to perform coding or decoding processes for JPEG2000 and which executes various instructions on the basis of a predetermined operating program to control the respective components in the MFP 10, a first memory 6 which is connected to the CPU 4 through a bridge 5 and which stores the operating program or the like, a memory controller 7, a built-in second memory 8 which is connected to another configuration in the MFP 10 through the memory controller 7, a JPEG2000 codec 20 serving as a hardware configuration which executes the coding/decoding processes in JPEG2000, and a memory 15 for wavelet transformation/inverse transformation, which is used in wavelet transformation and inverse wavelet transformation performed by the JPEG2000 codec 20. An external hard disk drive 9 (indicated by "HDD" in FIG. 2) is connected to the memory controller 7 as well as the second memory 8.

The MFP 10 has the scanner 11 which reads a manuscript to acquire image data of bitmap format, a raster I/F 12 which inputs the image data obtained from the scanner 11 to the data processing configuration in the MFP 10, a network interface card (indicated by "NIC" in FIG. 2) 13 which is connected to an external device on the network system 1 (see FIG. 1) as a data input/output port, an operation section 14 which is operated by user to execute various input setting, and a print engine 16 which prints an image on a sheet on the basis of the image data acquired by the scanner 11 or the image data transmitted from an external section through the NIC 13. These components are connected to each other through a bus 19 and the like to make it possible to transmit or receive data.

A flow of a process of converting the image data of bitmap format acquired from the scanner 11 into a JPEG2000 file in the MFP 10 will be briefly described below. First, the image data output from the scanner 11 is input to the raster I/F 12. Thereafter, the image data is transferred from the raster I/F 12 to the second memory 8 connected to the memory controller 7 with permitting direct memory access ("DMA"). Furthermore, the image data stored in the second memory 8 is transmitted to the JPEG2000 codec 20 by way of DMA. The image data is coded in JPEG2000 format in the JPEG2000 codec 20. JPEG2000 file data formed in the JPEG2000 codec 20 is transferred to the first memory 6 by way of DMA and stored therein. In response to a transmission request, the JPEG2000 file data stored in the first memory 6 is read and output outside through the NIC 13. With respect to data transfer to the terminal device 2, data is transmitted to a predetermined terminal device 2 via transfer by means of FTP or through an electronic mail server.

The MFP 10 has a function of, in transmitting a document file acquired by the scanner 11 to a plurality of destinations (terminal devices 2 or the like), making a specific region in the document invisible in each destination. In this manner, the security of information included in the respective regions can be assured. This function will be described below.

Figure 3B:
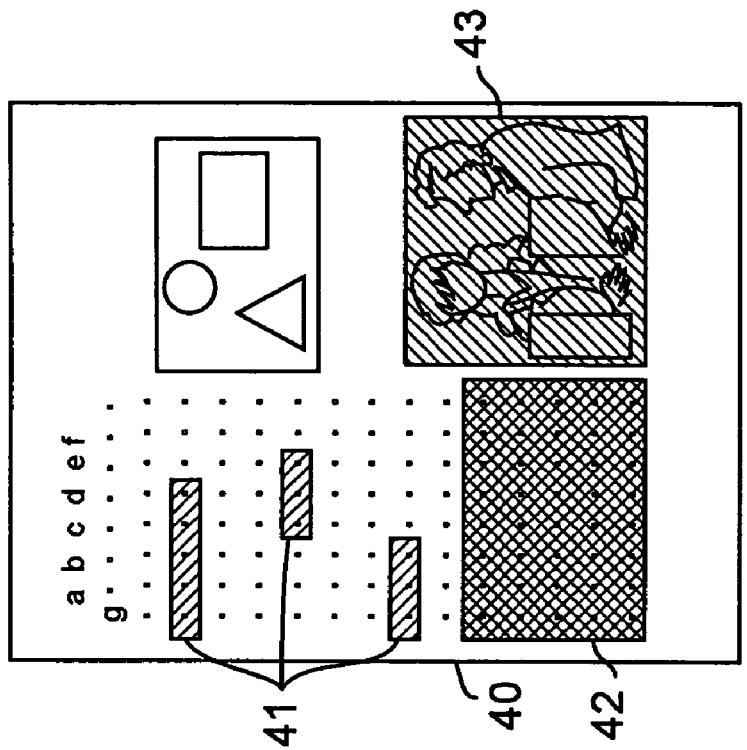
FIG. 3B is a diagram showing a document in which line markers of different colors are added to regions, respectively.
Figure 3A:
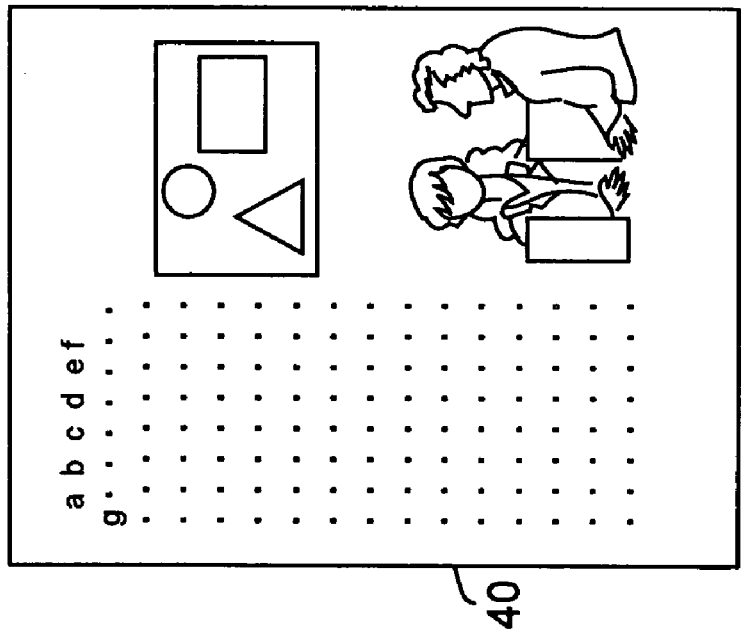
FIG. 3A is a diagram showing an original document according to the first embodiment.

FIG. 3A shows an example of the original document to be transmitted to a plurality of destinations. This original document 40 is a monochromatic document constituted by objects such as a text and an image. It is assumed that there are three destinations A, B, and C and that specific regions in the original document 40 for the respective destinations are to be made invisible. In this case, line markers of three colors are prepared for the three destinations, respectively. Different colors of the line markers are added to the regions which are to be made invisible for the respective destinations.

FIG. 3B shows the original document 40 in which different colors of the line markers are added to the regions. In FIG. 3B, the different colors are expressed by different hatched patterns, respectively. The same manner is used in the drawings to be described later. In this case, reference numeral 41 denotes red-colored regions obtained by adding red color of red line marker to several positions in the text. Reference numeral 42 denotes a yellow-colored region obtained by adding yellow color of yellow line marker to a large region in the text. Furthermore, reference numeral 43 denotes a blue-colored region obtained by adding blue color of blue line marker to one image.

Figure 4A:
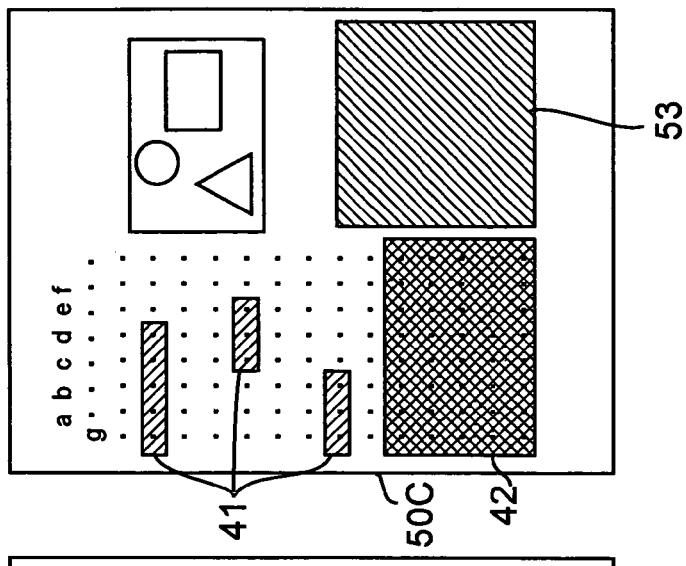
FIG. 4A is a diagram showing a document image transmitted to destination A.
Figure 4B:
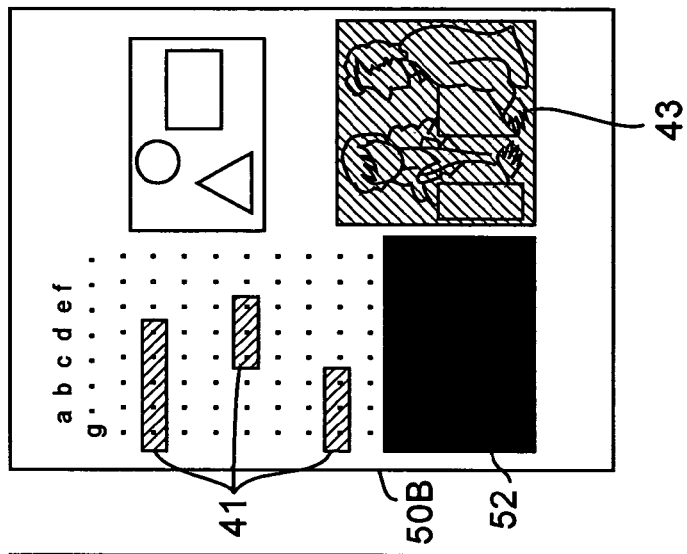
FIG. 4B is a diagram showing a document image transmitted to destination B.
Figure 4C:
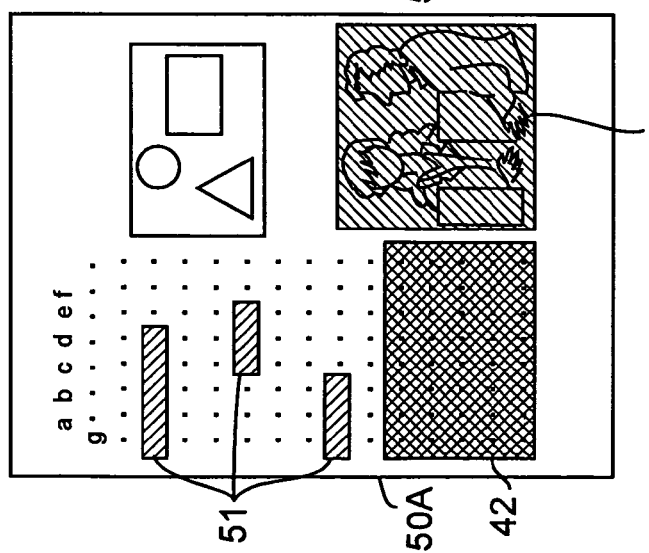
FIG. 4C is a diagram showing a document image transmitted to destination C.

In the MFP 10, a JPEG2000 file is formed on the basis of image data acquired by causing the scanner 11 to read the original document 40 with which the marker colors are added. Thereafter, files are generated from the JPEG2000 file, in which each colored regions are invisible for the destinations on the basis of relating information between the marker colors and the destinations. For example, a file in which the red-colored regions 41 are invisible is generated for destination A, a file in which a yellow-colored region 42 is invisible is generated for destination B, and a file in which a blue-colored region 43 is invisible is generated for destination C. In this case, images 50A, 50B, and 50C shown in FIGS. 4A, 4B, and 4C are acquired on the destinations A, B, and C, respectively. These images 50A, 50B, and 50C have a region 51 in which the red-colored regions 41 are invisible, a region 52 in which the yellow-colored region 42 is invisible, and a region 53 in which the blue-colored region 43 is invisible, respectively.

FIG. 5 is a diagram showing a flow of a process of coding image data into a JPEG2000 file and a process of forming different files for destinations, respectively, to make the region added with a predetermined marker color invisible. In FIG. 5, an outer frame drawn by a dotted line is shown as the JPEG2000 codec 20, and the blocks included in the outer frame show steps executed in the codec 20.

In this coding process, first, a level shift process (block 21) is executed to image data of bitmap format acquired by reading the manuscript in which the marker colors are added as shown in FIG. 3B by the scanner 11. In order to improve compression efficiency, a color conversion process (block 22) is executed. In this manner, RGB signals are converted into Y, Cb, and Cr color spaces. Reference symbol Y denotes a component representing a luminance (brightness), and reference symbols Cb and Cr denote components representing color differences. Thereafter, a tiling process is executed on the basis of a tile size set by a user through the operation section 14, and one image data is divided into a plurality of tiles each having the tile size (block 23).

Subsequently, a wavelet transformation process (block 24, expressed by "FDWT" in FIG. 5) is executed by using memory 15 for wavelet transformation/inverse transformation to subband-decompose the data in each tile. Thereafter, a quantization process (block 25) is executed for the plurality of divided tiles. In addition, a code block dividing process (block 26) and a bit plane modeling process (block 27) are executed to subbands subjected to the quantization process. In these processes, a quantized wavelet coefficient is decomposed into units called code blocks for an arithmetic coding process to be performed later, and the code blocks are expressed as bit planes. Thereafter, an arithmetic coding process (block 28) is executed to a coded string obtained by bit plaining. And then, a layer generation process (block 29) and a post quantization process (block 30) are executed to form a bit stream by bit strings obtained after the post quantization process (block 31). When a JPEG2000 file is acquired with the above processes, the JPEG2000 file is temporarily stored in a memory (for example, the second memory 8) (block 34).

In the MFP 10, upon forming a JPEG2000 file directly corresponding to the original document 40 added with the marker colors is formed, on the basis of color difference information (for example, Cb or Cr) of the image data, the presence/absence of marker colors is checked for each tile. More specifically, as is apparent from FIG. 5, after the tiling process (block 23), in parallel to the process of forming the JPEG2000 file, a tile underlayer is analyzed (block 32) to confirm whether the marker color is added or not for each tile.

In the process of analyzing the tile underlayer, the histogram of the color difference data is generated for each of the tiles constituting the image data. On the basis of the histogram result and color information of the line makers which is predetermined based on the relationship between the R, G, and B values of the marker colors as shown in FIG. 6 and the Y, Cb, and Cr values obtained after the color space conversion, it is checked whether the tile underlayers have the marker colors or not, i.e., whether the marker colors are added to the tiles or not. If the marker colors are added to the tiles, it is determined what marker colors they are. When it is determined in the process of analyzing the tile underlayers that the tile underlayer has the marker colors, the analysis result is stored in a memory (for example, the second memory 8) (block 333). In this manner, an analysis result of the marker colors on the tiles as shown in FIG. 7 can be obtained.

The JPEG2000 file which is formed in the processes in blocks 21 to 31 shown in FIG. 5 is read from the second memory 8, and a replacement process (block 35) is performed to the JPEG2000 file in units of tiles on the basis of the analysis result of the marker colors on the tiles. More specifically, with respect to a tile added with the marker colors, depending on a destination of the document file, the code data constituting the tile is replaced with predetermined code data for replacement (referred to as "replacement data" hereafter) as needed. In this manner, the JPEG2000 files corresponding to images available at each destination as shown in FIGS. 4A to 4C are generated.

Figure 8:
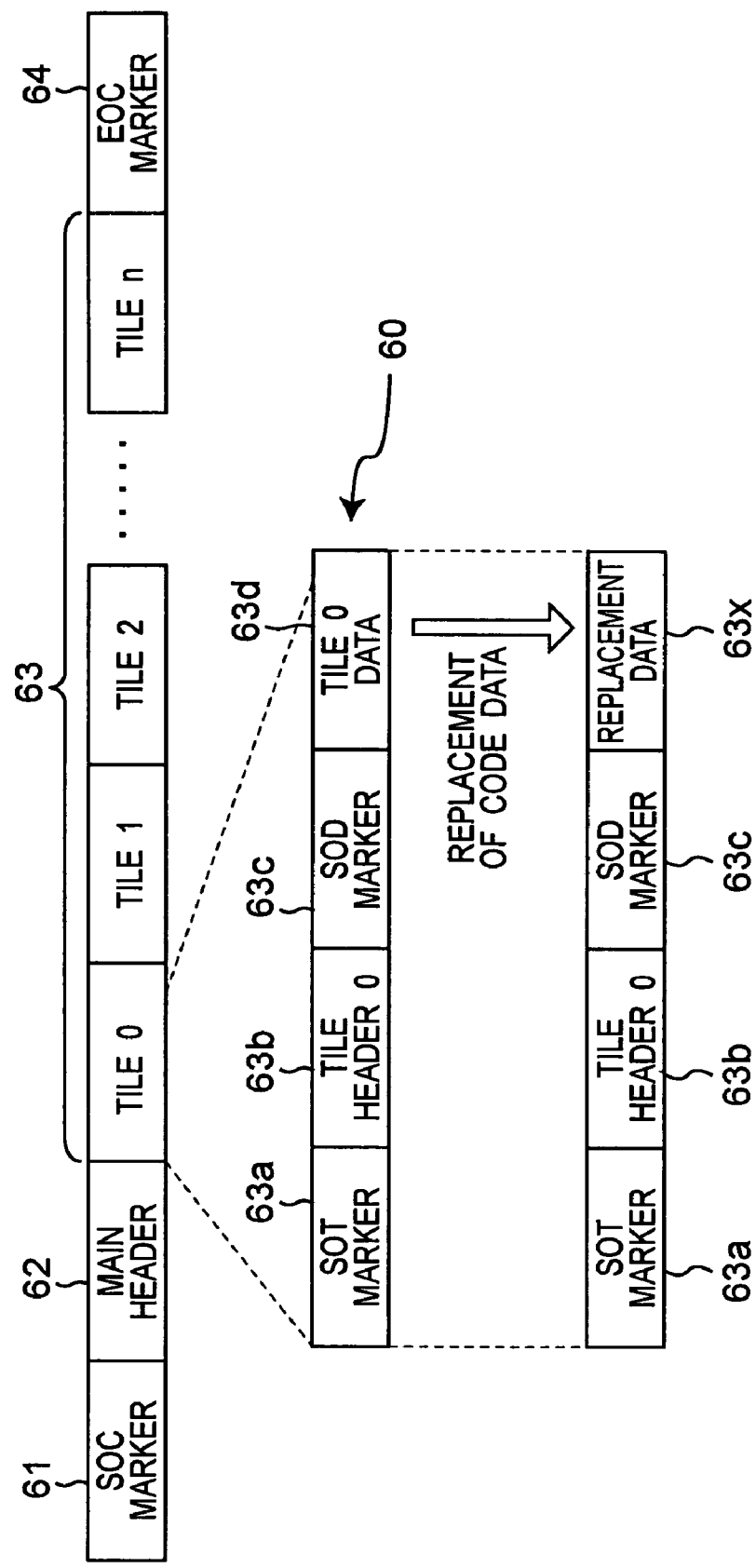
FIG. 8 is a diagram illustrating a code data replacing process of code data in a bitstream configuration of a JPEG2000 file.

FIG. 8 is a diagram for explaining a replacement process of the code data in the bit stream configuration of the JPEG2000 file. As is apparent from FIG. 8, basically, the JPEG2000 file 60 has an SOC (start of codestream) marker 61 at the head and an EOC (end of codestream) marker 64 at the end. JPEG2000 file 60 has a main header 62 and tile data 63 ("tile 0", "tile 1", . . . , "tile n" in FIG. 8) following the main header 62 between the SOC marker 61 and the EOC marker 64. Each tile data 63 corresponds to each of the tiles constituting the JPEG2000 file and is constituted by a SOT (start of tile) marker 63a serving as a tile start marker, a tile header 63b, a SOD (start of data) marker 63c serving as a data start marker, and a code data 63d ("tile 0 data" in FIG. 8) constituting actual tile data. In FIG. 8, the configuration of the tile data 63 is shown with respect to only the "tile 0", however the configuration of another tile data is the same as the configuration related to the "tile 0".

In the replacement process of code data, the code data 63d subsequent to the SOD marker 63c is replaced with replacement data 63x which is prepared in advance. As the replacement data 63x, code data including information of a color (replacement color) by which a tile to be replaced is represented after the replacement process is prepared. When the code data 63d constituting the tile to be replaced is replaced with the replacement data 63x, a new tile represented by the replacement color is generated. As a result, an image or a text included in the tile to be replaced is deleted and thus the image or the text becomes invisible on the destination side.

Figures 9, 10:
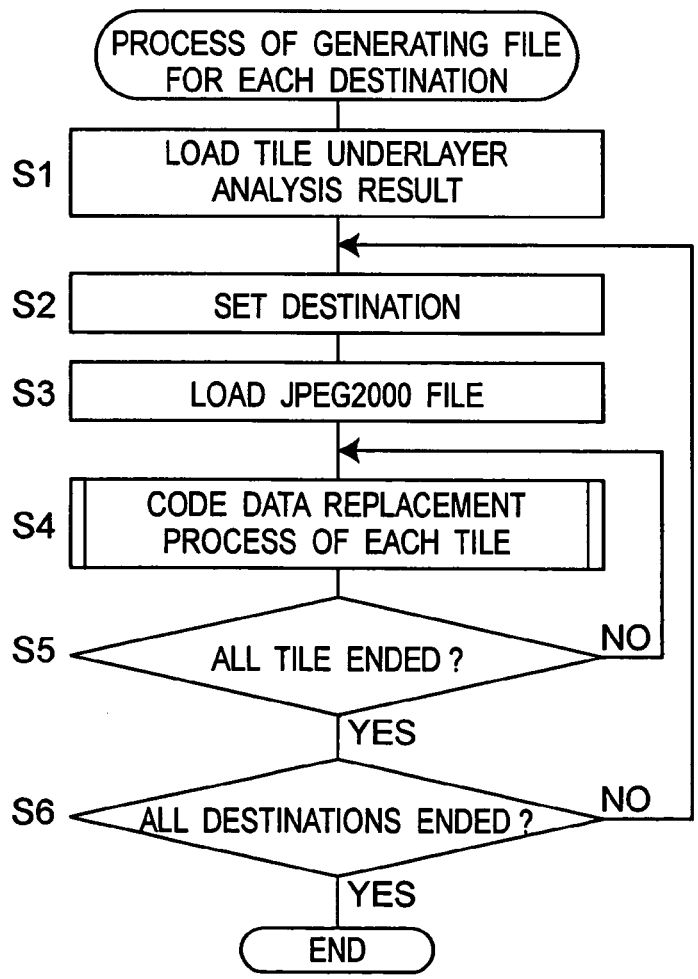
FIG. 9 is a table showing the relationship of "marker color", "destination", and "replacement color" which are set prior to transmission of a document file in an MFP.
FIG. 10 is a flow chart of a process of generating file for each of destinations according to the first embodiment.

FIG. 9 is a table showing the relationship between "marker color", "destination", and "replacement color" which are set prior to transmission of a document file in the MFP 10. The respective items "marker color", "destination", and "replacement color" in the table are arbitrarily set by a user through the operation section 14 of the MFP 10 and a destination (the terminal devices 2 or the like) connected through a network. At this time, for example, a "marker color" added to a region to be made invisible is set for the "destination", and "replacement color" by which the tiles should be represented after the replacement process is set.

In the table shown in FIG. 9, a destination "A" and a replacement color "red" are set for red marker color added to a predetermined region in the document, a destination "B" and a replacement color "black" are set for yellow marker color, and a destination "C" and a replacement color "blue" are set for blue marker color. Depending on such settings, in a document file to be transmitted to a destination "A", a region added with red marker color is made invisible by code data which brings a replacement color "red". In a document file to be transmitted to a destination "B", a region added with yellow marker color is made invisible by data which brings a replacement color "black". In a document file to be transmitted to a destination "C", a region added with a blue marker color is made invisible by data which brings a replacement color "blue". And then, on the basis of the document 40 shown in FIG. 3B, images shown in FIGS. 4A, 4B, and 4C are acquired at the destinations "A", "B", and "C", respectively.

FIG. 10 is a flow chart of a process of generating file for each destination, which is performed with reference to a tile underlying analysis result after a JPEG2000 file corresponding to image data acquired by the scanner 11 is formed, according to the first embodiment. This process is executed by the CPU 4 according to a program stored in the first memory 6. In this process, the analysis result of the tile underlayer shown in FIG. 7 is loaded to make it possible to use the analysis result in the next step or later (step S1). Subsequently, a destination is set (step S2). If there are a plurality of destinations such as the destinations "A", "B", and "C", any one of the destinations is set. At this time, according to the table shown in FIG. 9, a "marker color" and a "replacement color" which are set for the "destination" are automatically determined.

Thereafter, the JPEG2000 file stored in the second memory 8 is loaded (step S3). Subsequently, with reference to a predetermined destination, a marker color, and a replacement color, a replacement process of code data is executed for each tile if necessary (step S4). The detailed flow of the replacement process will be described later with reference to FIG. 11.

In addition, the CPU 4 decides whether the replacement process of code data is performed to all the tiles or not (step S5). As a result, when it is determined that the replacement process for all the tiles is not completed, the CPU 4 returns to step S4 to repeat the subsequent processes. On the other hand, when it is determined that the replacement process for all the tiles is completed, continuously, it is decided whether the series of processes are completed for all the destinations or not (step S6). As a result, it is determined that the processes for all the destinations are not completed, the CPU 4 returns to step S2 to repeat the subsequent processes. On the other hand, it is determined that the processes for all the destinations are completed, the CPU 4 ends the processes.

Figure 11:
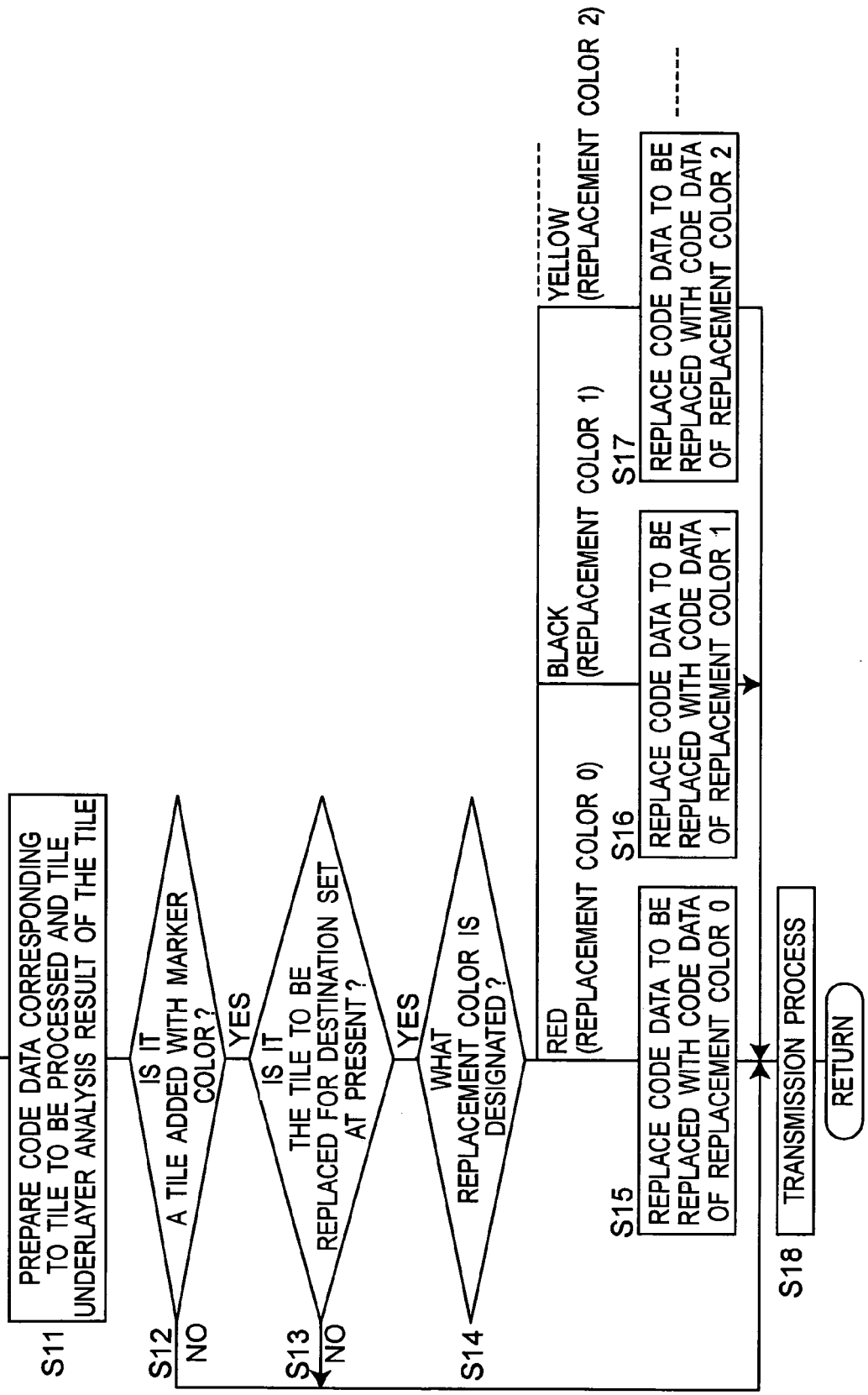
FIG. 11 is a flow chart of a tile code replacing process in step S4 in FIG. 10.

FIG. 11 is a flow chart of a process of replacing code data for each tile in step S4 shown in FIG. 10. In this process, in addition to code data (tile data) corresponding to a tile to be processed next, an analysis result of the tile underlayer of the tile is prepared on the basis of a loaded JPEG2000 file to prepare for the subsequent processes (step S11). With reference to the analysis result of the tile underlayer, it is decided whether the tile which is being processed at the present is a tile added with marker color or not (step S12). As a result, when the tile is not a tile added with marker color, the CPU 4 shifts to step S18 to transmit the code data to a destination without performing a replacement process of the code data.

On the other hand, in step S12, when it is determined that the tile is a tile added with marker color, it is decided whether the tile is a tile to be replaced for a destination which is set at the present or not (step S13). For example, according to the settings in the table shown in FIG. 9, when the destination is set as "A", it is checked whether the analysis result of the tile underlayer is "red" or not. If the analysis result is "red", the tile is determined as a tile to be replaced. On the other hand, when the analysis result is "yellow" or "blue" except for "red", it is determined that the tile is not a tile to be replaced. As a result, when the tile is not determined as a tile to be replaced, the CPU 4 shifts to step S18, the tile data is transmitted to the destination without performing a new process.

On the other hand, in step S13, when the tile is determined as a tile to be replaced, with reference to the table shown in FIG. 9, a replacement color set for the present destination is determined (step S14). Subsequently, code data constituting the tile to be replaced is replaced with code data which brings a replacement color. Steps S15, S16, and S17 are processes performed when the replacement colors are red, black, and yellow, respectively. Tile data obtained by the replacement processes are transmitted to the set destination (step S18). Thereafter, the CPU 4 returns to the processes shown in FIG. 10.

As is apparent form the above description, in the first embodiment, marker colors are set for destinations, respectively, code data of regions added with marker colors corresponding to the destinations are replaced with other code data to make information included in the regions invisible, thereby assuring the security of the document information. In this case, document files in which different regions are secured for the different destinations can be easily formed by only adding different marker colors to one original document.

In the first embodiment, the JPEG2000 file is processed in units of tiles and transmitted for each destination, but not limited to this embodiment, code data which is common to a plurality of destinations, of code data constituting the JPEG2000 file may be simultaneously transmitted to the destinations, and code data which are different between the destinations may be independently transmitted to the destinations. In this manner, time required to transmit the JPEG2000 files to all the destinations, i.e., communication time between the transmitter and the destinations can be shortened.

In the first embodiment, as shown in the table shown in FIG. 9, predetermined marker colors are set for respective destinations, and a region added with a corresponding marker color is made invisible in a document file to be transmitted to a certain destination. In contrast to this, a replacement process may be performed to a region except for the region added with the corresponding marker color to make the region invisible.

In addition, in the first embodiment described above, a tile which is added with a marker color and which is not to be replaced is directly transmitted with the marker color, but not limited to this embodiment, in addition to replacing code data of a tile to be replaced in the replacement process, code data of a tile which is not a tile to be replaced may be replaced with another code data to remove the marker color. Removal of the marker color can be realized by replacing the code of color difference data (Cb and Cr) with code data corresponding to an achromatic color. In this manner, in an image 50A shown in FIG. 4A, marker colors added to the character region 42 and the image region 43 are removed, and images which are more faithful to an original document can be obtained at a destination.

Second Embodiment

In the first embodiment described above, the process of replacing code data corresponding to a region with which a line marker color with another code data to make information included in the region invisible is performed. Differently from the first embodiment, in the second embodiment, a data amount of code data corresponding to a region added with a line marker color or a region except for the region added with a line marker color is reduced so as to produce, as an image corresponding to the region, a low-quality image in which an outline such as the type of object (image or text) can be recognized but details cannot be recognized. Hereinafter, such a process is described. The same reference numerals as in the first embodiment denote the same parts in the following description.

FIG. 12A shows an example of an original document to be transmitted to a plurality of destinations. This original document 70 is a monochromatic document constituted by a plurality of text blocks 70a, 70b, 70c, and 70d. It is assumed that there are two destinations A and B and that only specific regions in the original document 70 are made readable for destinations. In this case, line markers of at least two colors are prepared for the two destinations A and B. The different line marker colors are added to regions which are desirably made readable for the destinations.

FIG. 12B shows the original document 70 in which predetermined marker colors are added to different regions, respectively. Reference numeral 71 denotes a yellow-colored region obtained by adding yellow color of yellow marker to the upper text block 70a. Reference numeral 72 denotes a red region obtained by adding red color of red marker to the intermediate text blocks 70b and 70c. Reference numeral 73 denotes a region corresponding to the lower text block 70c and added with no marker color.

In the MFP 10, a JPEG2000 file is formed on the basis of image data acquired by causing the scanner 11 to read the document 70 added with the marker colors, and thereafter, files are generated from the JPEG2000 file, in which regions except for the color regions are low-quality images, for the destinations on the basis of the relating information between the marker colors and the destinations. For example, a file in which the regions 71 and 73 except for the red-colored region 72 cannot be read is generated for destination A, and a file in which the regions 72 and 73 except for the yellow-colored region 71 cannot be read is generated for destination B. In this case, images 80A and 80B as shown in FIGS. 13A and 13B are represented for destinations A and B, respectively. These images 80A and 80B have low-quality regions 81 and 83 obtained by making it impossible to read the regions 71 and 73 and low-quality regions 82 and 83 obtained by making it impossible to read the regions 72 and 73.

A process of generating files in the MFP 10 according to the second embodiment will be described below. When a document as shown in FIG. 12B is read with the scanner 11 to acquire image data, as in the case of the first embodiment, a JPEG2000 file is formed on the basis of the image data. In parallel to the process of forming the JPEG2000 file, a tile underlayer is analyzed to check whether a marker color is added to each tile or not. Thereafter, in the second embodiment, in a document file to be transmitted to each destination, a process of reducing an amount of code data constituting a tile to which a marker color corresponding to the destination is not added is executed to the tile.

FIG. 14 is a diagram for explaining a process of reducing an amount of code data in a bit stream configuration of the JPEG2000 file. In the process of reducing the code data amount, the code data 63d subsequent to the SOD marker 63c is partially cut to be converted into tile data 63z having a small data amount. A concrete process of reducing a code data amount will be described below with reference to FIGS. 15A and 15B.

Figure 15A:
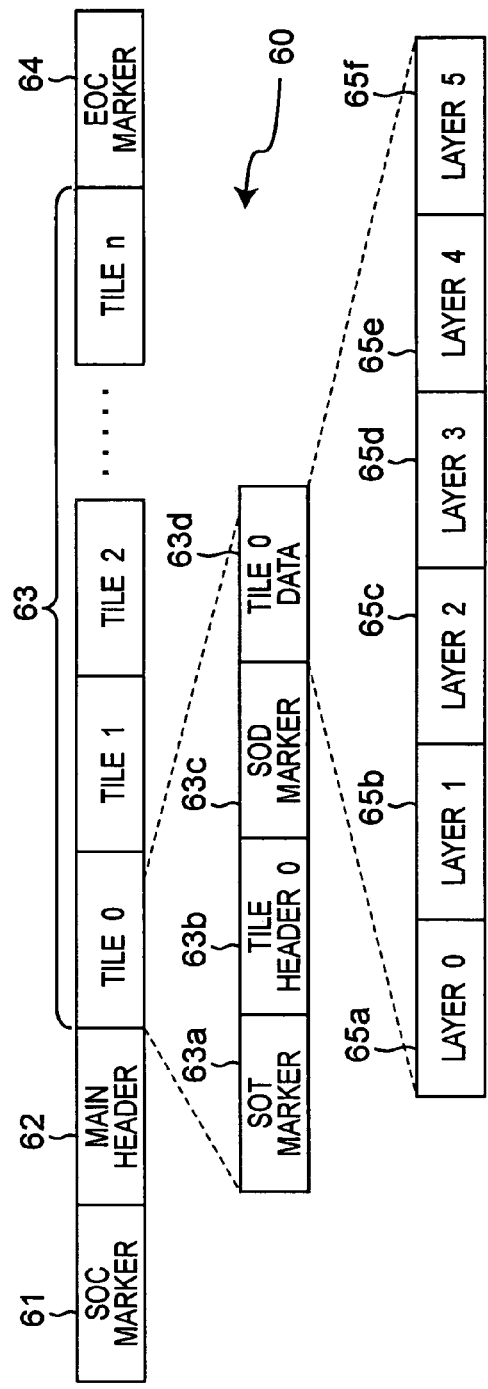
FIG. 15A is a diagram showing a bitstream configuration of a JPEG2000 file obtained before a code data amount is reduced.
Figure 15B:
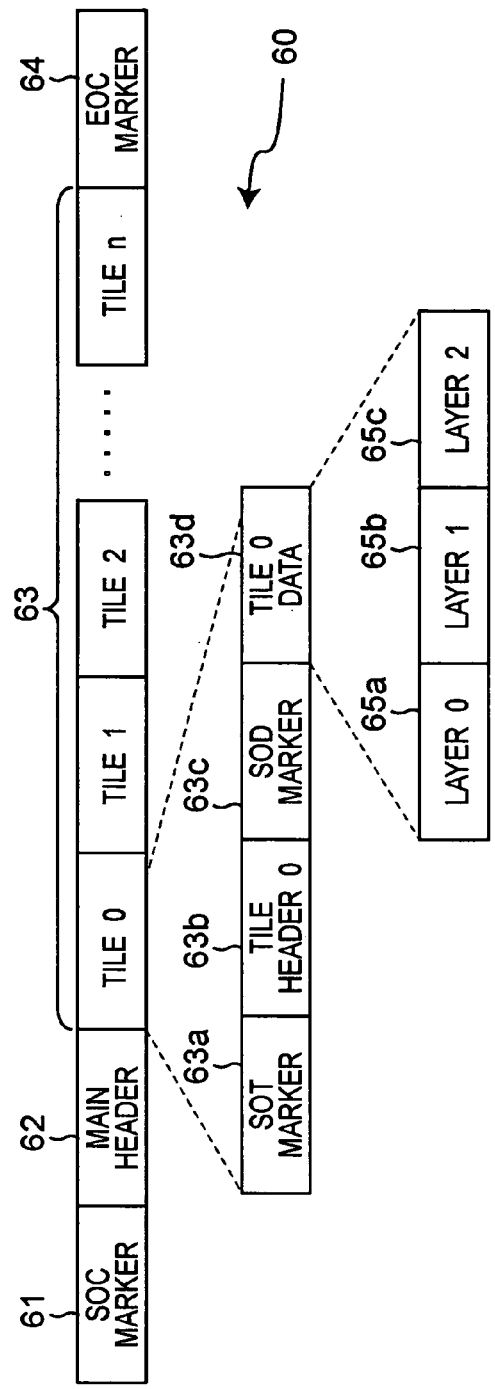
FIG. 15B is a diagram showing a bitstream configuration of a JPEG2000 file obtained after a code data amount is reduced.

FIGS. 15A and 15B are diagram for explaining a process of reducing a code data amount in a bitstream configuration of a JPEG2000 file. As is apparent from FIG. 15A, in this bitstream configuration, code data constituting each tile is divided by "layer generation" indicated by block 29 in FIG. 5 into a plurality of layers 65a to 65f ("layer 0", "layer 1", . . . , "layer 5"), and also has scalability achieved by the layers. In this case, the highest degree of contribution to image quality is achieved by layer 0, and the degree of contribution decreases as the number of layer is close to 5. When all the layers are used, the extended image has the highest quality.

In the process of reducing a code data amount, as shown in FIG. 15B, a process of cutting several layers (layers 3, 4, and 5) having lower degrees of contribution to image quality is executed. In this manner, an amount of code data corresponding to a region except for a region added with no marker color is reduced to make it possible to decrease image quality.

Figures 16, 17:
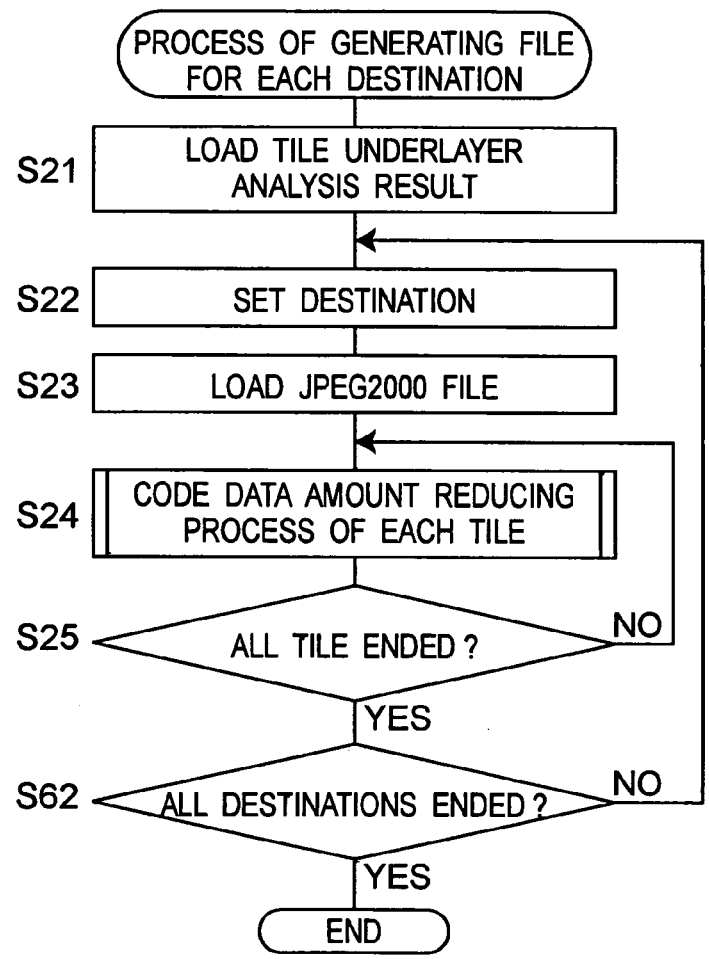
FIG. 16 is a table showing the relationship between "marker color" and "destination" which are set prior to transmission of a document file in an MFP.
FIG. 17 is a flow chart of a file forming process for each destination according to the second embodiment.

FIG. 16 is a table showing the relationship between a "marker color" and a "destination" set on the MFP 10 prior to transmission of a document file. The items "marker color" and "destination" in the table are arbitrarily set by a user through the operation section 14 of the MFP 10, the terminal devices 2 or the like connected through the network. In the table shown in FIG. 16, destinations "A", "B", and "C" are set for red, yellow, and blue markers added to predetermined regions in the document. According to the settings, in the document file to be transmitted to destination "A", a region except for a region added with a red marker color is represented as low-quality image. In the document file to be transmitted to destination "B", a region except for a region added with a yellow marker color is represented as low-quality image. In a document file to be transmitted to destination "C", a region except for a region added with a blue marker color is represented as low-quality image. And thus, images shown in FIGS. 14A and 14B are acquired for destinations "A" and "B", respectively, from the document 70 shown in FIG. 12B.

FIG. 17 is a flow chart of a process of generating files for each destination performed with reference to a tile underlayer analysis result after a JPEG2000 file corresponding to image data acquired from the scanner 11 is formed, according to the second embodiment. This process is executed by the CPU 4 according to a program stored in the first memory 6. In the process, the tile underlayer analysis result as shown in FIG. 7 is loaded such that the tile underlayer analysis result can be used in the processes of the next step or later (step S21). Subsequently, a destination is set (step S22). When there are a plurality of destinations, any one of the destinations is set. At this time, according to the table shown in FIG. 16, a "marker color" set in relation to "destination" is automatically determined.

Thereafter, the JPEG2000 file stored in the second memory 8 is loaded (step S23). Subsequently, if necessary, a process of reducing a code data amount is executed for each tile with reference to the predetermined destination and marker color (step S24). The detailed flow of the reducing process will be described later with reference to FIG. 18.

In addition, it is decided whether the process of reducing a code data amount is executed for all the tiles or not (step S25). As a result, when it is determined that the reducing process to all the tiles is not completed, the CPU 4 returns to step S24 to repeat the subsequent processes. On the other hand, when it is determined that the reducing process to all the tiles is completed, continuously, it is decided whether the series of processes are performed to all the destinations or not (step S26). As a result, when it is determined that the processes to all the destinations are not completed, the CPU 4 returns to step S22 to repeat the subsequent processes. On the other hand, when it is determined that the process to all the destinations is completed, the process is ended.

Figure 18:
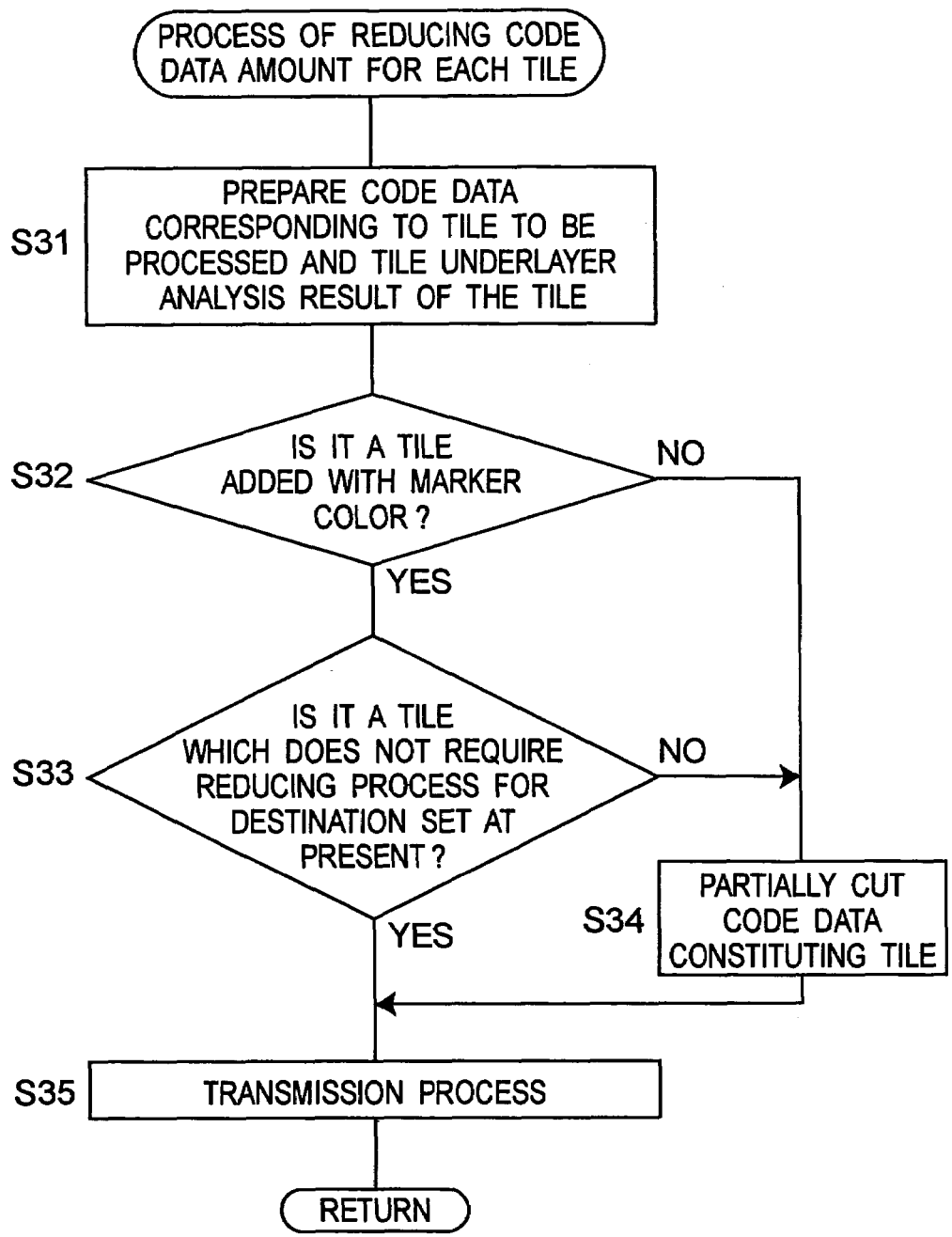
FIG. 18 is a flow chart of a code data amount reducing process in step S23 of FIG. 17.

FIG. 18 is a flow chart of a process of reducing a data amount of code data constituting a tile in step S23 in FIG. 17. In this process, on the basis of the loaded JPEG2000 file, code data corresponding to a tile to be processed next and a tile underlayer analysis result of the tile are prepared to prepare for the subsequent processes (step S31). With reference to the tile underlayer analysis result, it is decided whether the tile which is being processed at the present is a tile added with a marker color or not (step S32). As a result, when it is determined that the tile is not a tile added with a marker color, the CPU 4 executes a process of reducing a code data amount of the tile to partially cut off the code data constituting the tile (step S34) and shifts to step S35 to transmit the code data to a destination.

On the other hand, when it is determined in step S32 that the tile is a tile added with a marker color, continuously, it is decided whether the tile is a tile to be transmitted to the destination set at the present while keeping high quality, i.e., a tile which does not require a reducing process or not (step S33). For example, when a destination is set to be "A" with reference to FIG. 16, it is checked whether a tile underlying analysis result is "red" or not. When the tile underlayer analysis result is "red", it is determined that the tile does not require a reducing process. On the other hand, when the tile underlayer analysis result is "yellow" or "blue", it is determined that the tile is a tile which should be subjected to a reducing process. As a result, when the tile is a tile which should be subjected to a reducing process, the process of reducing a code data amount of the tile is performed, and code data constituting the tile is partially cut off (step S34), and the code data is transmitted to a destination. On the other hand, in step S33, it is determined that the tile is a tile which does not require a reducing process, the CPU 4 directly shifts to step S35 to transmit the code data to a destination. Thereafter, the CPU 4 returns to the process shown in FIG. 17.

In the example described above, when a code data amount is reduced, a predetermined amount of code data (layers 3 and 4 in FIG. 15) are cut off, but not limited to this example, a code data amount to be cut off is changed for each marker color depending on the degree of importance of information included in a document file so that multi-level image quality may be provided to an image represented at a destination. In order to realize this, for example, in the MFP 10, as shown in FIG. 19, "cutoff level" is set depending on "marker color" and "destination". This "cutoff level" expresses a code data amount to be cut off in a process of reducing an amount of code data constituting a tile. For example, a process of reducing a code data amount is not performed to a tile added with a marker color to which a cutoff level "0" is set. For a tile added with a marker color to which a cutoff level "1" is set, of a plurality of layers 65a to 65f constituting tile data shown in FIG. 15A, only the layer 65f is cut off. For a tile added with a marker color to which a cutoff level "2" is set, the layers 65e and 65f are cut off. From an image represented at a destination through these processes, the degree of importance of information included in the image can be more exactly recognized.

With respect to a region added with no marker color, as shown in FIGS. 15A and 15B, the three layers 65d, 65e, and 65f are cut off, and thus, the cutoff level is "3".

As is apparent from the above description, in the second embodiment, marker colors are set for destinations, respectively, and, in a document file, code data of a region except for a region added with a marker color corresponding to each destination is partially cut off to reduce the amount of code data, so that display image quality of a specific region can be changed depending on the destinations. In this manner, for example, when a code data amount is reduced to extremely degrade image quality, information included in a specific region in a document can be secured. In this case, on a destination side, a specific part in a document to which attention must be given or a specific part in the document which is desired by a transmitter to be seen can be appropriately recognized. In addition, in this case, since a code data amount is reduced, suppression of use of memory resources and shortening of communication time can be realized.

The present invention is not limited to the above illustrated embodiments. Various modifications and changes in design can be effective without departing from the spirit and scope of the present invention, as a matter of course. For example, in the embodiments described above, the present invention is applied to a single MFP 10, however, the present invention may also be applied to a system constituted by independent devices such as a personal computer, a display, and a scanner.

What is claimed is:

1. An image processing system which can code image data, form a JPEG2000 file, and transmit the JPEG2000 file to a plurality of destinations, comprising:
   a designator which designates a first region present in the JPEG2000 file and a second region present in the JPEG2000 file, said second region is different from said first region;
   a processor, coupled to a memory, that is programmed to replace code data constituting said first region with code data which make pieces of information included in the first region invisible in the JPEG2000 file to be transmitted to a first destination and replace code data constituting said second region with code data which make pieces of information included in the second region invisible in the JPEG2000 file to be transmitted to a second destination; and
   a transmitter which transmits the JPEG2000 files processed by the replacer to the first and second destinations, respectively.

2. An image processing system according to claim 1, wherein different color components are added to the first and second regions preset in the image data, respectively, and the image processing system comprises a color component detector which detects the color components to recognize the regions.

3. An image processing system according to claim 1, wherein the code data in the JPEG2000 file, which are common to the plurality of destinations, are simultaneously transmitted, and only different code data is transmitted to the destinations.

4. An image processing system according to claim 1, wherein said processor is programmed to replace the code data based on a table showing relationships between the regions designated by said designator and the destinations which are set prior to the transmission of the JPEG2000 file.

5. An image processing system which can code image data, form a JPEG2000 file, and transmit the JPEG2000 file to a plurality of destinations, comprising:
   a designator which designates a first region present in the JPEG2000 file and a second region present in the JPEG2000 file, said second region is different from said first region;
   a processor, coupled to a memory, that is programmed to reduce a data amount of code data constituting said first region in the JPEG2000 file to be transmitted to a first destination and reduce a data amount of code data constituting said second region in the JPEG2000 file to be transmitted to a second designation; and
   a transmitter which transmits the JPEG files processed by the data amount reducer to the first and second destinations, respectively.

6. An image processing system according to claim 5, wherein the data amount of the code data reduced from the first and second regions by the data amount reducer can be set for the respective destinations and the regions.

7. An image processing system according to claim 5, wherein different color components are added to the regions preset in the image data, respectively, and the image processing system comprises a color component detector which detects the color components to recognize the regions.

8. An image processing system according to claim 5, wherein the code data in the JPEG2000 file, which are common to the plurality of destinations, are simultaneously transmitted, and only different code data is transmitted to the destinations.

9. An image processing system according to claim 5, wherein said a processor is programmed to replace the code data based on a table showing relationships between the regions designated by said designator and the destinations which are set prior to the transmission of the JPEG2000 file.

10. An image processing method for coding image data, forming a JPEG2000 file, and transmitting the JPEG2000 file to a plurality of destinations, the method comprising steps of:

designating a first region present in the image data and a second region present in the image data, said second region is different from said first region;

replacing, using a processor, code data constituting said first region with code data which make pieces of information included in the first region invisible in the JPEG2000 file transmitted to a first destination and replacing code data constituting said second region with code data which make pieces of information included in the second region invisible in the JPEG2000 file transmitted to a second destination;

transmitting the processed JPEG2000 files to the destinations.

11. An image processing method for coding image data, forming a JPEG2000 file, and transmitting the JPEG2000 file to a plurality of destinations, the method comprising steps of:

designating a first region present in the image data and a second region present in the image data, said second region is different from said first region;

reducing, using a processor, a data amount of code data constituting said first region in the JPEG2000 file transmitted to a first destination and reducing a data amount of code data constituting said second region in the JPEG2000 file transmitted to a second destination; and transmitting the processed JPEG files to the destinations.

12. An image processing method for coding image data, forming a JPEG2000 file, and transmitting the JPEG2000 file to a plurality of destinations, the method comprising steps of:

relating a plurality of regions preset in the image data to destinations;

loading the JPEG2000 file;

replacing, using a processor, code data constituting one of regions corresponding to one destination with code data which make pieces of information included in the region invisible in the JPEG2000 file transmitted to said one destination;

transmitting the processed JFEG2000 file to said one destination; and repeating said steps of loading, replacing and transmitting until all regions are reduced and transmitted to all destinations.

13. An image processing method for coding image data, forming a JPEG2000 file, and transmitting the JPEG2000 file to a plurality of destinations, the method comprising steps of relating a plurality of regions preset in the image data to destinations;

loading the JPEG2000 file;

reducing, using a processor, a data amount of code data constituting one of regions corresponding to one destination in the JPEG2000 file transmitted to said one destination;

transmitting the processed JPEG2000 file to said one destination;

repeating said steps of loading, replacing and transmitting until all regions are reduced and transmitted to all destinations.

\* \* \* \* \*

UNITED STATES PATENT AND TRADEMARK OFFICE
CERTIFICATE OF CORRECTION

| | | |
|---|---|---|
| PATENT NO. | : 7,733,511 B2 | |
| APPLICATION NO. | : 10/808375 | |
| DATED | : June 8, 2010 | |
| INVENTOR(S) | : Kenichi Takahashi et al. | |

It is certified that error appears in the above-identified patent and that said Letters Patent is hereby corrected as shown below:

Column 14, claim 12, line 18, please change "JFEG2000" to --JPEG2000--.

Signed and Sealed this

Twenty-sixth Day of October, 2010

David J. Kappos
*Director of the United States Patent and Trademark Office*